UNITED STATES PATENT OFFICE.

HUGH FITZALIS KIRKPATRICK-PICARD, OF LONDON, ENGLAND.

PROCESS OF RECOVERING ZINC FROM SULFID ORES.

SPECIFICATION forming part of Letters Patent No. 692,148, dated January 28, 1902.

Application filed July 9, 1901. Serial No. 67,637. (No specimens.)

*To all whom it may concern:*

Be it known that I, HUGH FITZALIS KIRKPATRICK-PICARD, a subject of the King of England, residing at London, England, have invented a certain new and useful Improved Process for the Recovery of Zinc from Sulfid Ores, (for which I have made application for Letters Patent in Great Britain under No. 22,570, dated the 11th of December, 1900,) of which the following is a specification.

The object of my invention is the recovery of zinc from ores in which the zinc exists as sulfid without the necessity of roasting the ore, as is usually done.

It is well known that certain substances will decompose sulfid of zinc, (blende,) such as finely-divided metallic iron, oxid of iron and carbon, &c.; but hitherto no advantage has been taken of this fact, as a necessary product of such reaction would be a more or less fusible sulfid, which would rapidly destroy the retort in which the ore charge is distilled. By my invention I am enabled to prevent this rapid destruction and can therefore apply these reactions to the recovery of zinc from its ores in an economical and efficient manner.

My invention is carried into effect by mixing the unroasted ore and the reducing or desulfurizing agent or agents with carbonaceous material of a bituminous character, such as will on distillation form a coke. This material may be bituminous coking coal, tar, pitch, or similar carbonaceous substance. The well-mixed materials are then preferably formed into briquets, which are charged into a suitable distillation-furnace for the recovery of the zinc, which is condensed in the usual manner. Where the reducing agent employed is iron or oxid of iron and carbon, the fusible sulfid of iron produced is prevented from running together by the carbonaceous skeleton of coke which is produced during the distillation of the mixture, and thus is prevented from coming into contact with and attacking the walls of the retort or vessel in which distillation takes place. The residue will also contain any lead, copper, gold, silver, &c., that may have been associated with the zinc ore, which metals may be recovered from said residue by suitable means.

My invention can be applied to what are known as "complex sulfid ores," containing blende, galena, and silver, such as the Broken Hill type of ores. When treating such mixed ores of zinc, lead, and silver, it is obvious that the lead sulfid (galena) will also be reduced with the production of metallic lead. The lead will be found held up by the carbonaceous skeleton or come in finely-divided particles, and thus prevented from melting into a mass and causing injury to the retort.

In my United States Patent No. 665,744 I described a similar process applied to roasted or oxidized ores, and I make no claim herein to such process, but confine myself to the treatment of unroasted ores.

I do not confine myself to the use of any special reagent or reagents for decomposing the zinc sulfid by my process; but I prefer to use either oxid of iron and carbon or lime and carbon.

$$ZnS + CaO + C = Zn + CaS + CO.$$
$$PbS + CaO + C = Pb + CaS + CO.$$
$$4ZnS + 2Fe_2O_3 + 6C = 4Zn + 4FeS + 6CO.$$
$$4PbS + 2Fe_2O_3 + 6C = 4Pb + 4FeS + 6CO.$$

These equations show the reactions which take place when either lime and carbon or oxid of iron and carbon are used as reducing agents for blende and galena. If iron or iron oxid and carbon be used as the reducing agent, the resulting sulfid of iron may, if desired, be subsequently reoxidized for the treatment of further quantities of zinc sulfid. In the event of mixed sulfids of zinc and lead being treated or zinc sulfid containing copper, gold, silver, or the like then the resulting ferrous sulfid may be treated for the recovery of such metals, preferably by smelting processes.

What I claim as my invention, and desire to secure by Letters Patent, is—

1. The process of treating sulfid ores containing zinc, which consists in mixing the unroasted ore with a basic material capable of combining with sulfur, and carbonaceous material suitable for coking, forming the mixture into briquets and distilling the briquets in such conditions that they are first coked into coherent masses, and finally the zinc is reduced and volatilized, while the resulting sulfid is retained in minute particles throughout the coke.

2. The process of treating sulfid ores containing zinc and other metals, which consists in mixing the unroasted ores with a basic material capable of combining with sulfur, and carbonaceous material suitable for coking, forming the mixture into briquets and distilling the briquets under such conditions that they are first coked into coherent masses and finally the zinc is reduced and volatilized while the resulting sulfid and the non-volatile metals are retained in minute particles throughout the coke.

In testimony whereof I have signed my name to this specification in the presence of two subscribing witnesses.

HUGH FITZALIS KIRKPATRICK-PICARD.

Witnesses:
A. McKENZIE,
WALTER J. SKERTEN.